US009465508B1

(12) United States Patent
Marek et al.

(10) Patent No.: US 9,465,508 B1
(45) Date of Patent: Oct. 11, 2016

(54) HIGH ASSURANCE CLASSIFICATION DISAMBIGUATION OF USER INPUT ON TACTICAL DISPLAY SYSTEMS

(75) Inventors: James Marek, Anamosa, IA (US); David A. Greve, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 95 days.

(21) Appl. No.: 13/495,594

(22) Filed: Jun. 13, 2012

(51) Int. Cl.
*G06F 21/00* (2013.01)
*G06F 3/0481* (2013.01)
*G06F 21/84* (2013.01)

(52) U.S. Cl.
CPC ............. *G06F 3/0481* (2013.01); *G06F 21/84* (2013.01)

(58) Field of Classification Search
CPC ................................. G06F 21/10; G06F 21/60
USPC .......................................... 726/2, 26; 705/51
See application file for complete search history.

(56) References Cited

U.S. PATENT DOCUMENTS

| | | | |
|---|---|---|---|
| 7,734,916 B2 * | 6/2010 | LiVecchi ...................... 713/166 |
| 8,161,281 B1 * | 4/2012 | Johnson et al. ............... 713/166 |
| 8,462,018 B1 * | 6/2013 | Shepherd et al. ............. 340/945 |
| 8,875,226 B1 * | 10/2014 | Marek ..................... G06F 21/84 713/166 |
| 8,904,556 B1 * | 12/2014 | Bertram .................. G06F 21/84 380/200 |
| 2002/0172365 A1 * | 11/2002 | Nakagomi et al. ........... 380/270 |
| 2003/0105979 A1 * | 6/2003 | Itoh et al. ..................... 713/201 |
| 2005/0149486 A1 * | 7/2005 | Nason et al. ..................... 707/1 |
| 2005/0246535 A1 * | 11/2005 | Adams et al. ................ 713/170 |
| 2006/0224478 A1 * | 10/2006 | Harbison et al. ............... 705/32 |
| 2007/0282752 A1 * | 12/2007 | Jones et al. ..................... 705/57 |
| 2008/0180740 A1 * | 7/2008 | Kimura et al. .............. 358/1.15 |
| 2012/0291118 A1 * | 11/2012 | Hiramatsu ..................... 726/16 |
| 2012/0314018 A1 * | 12/2012 | Wengrovitz ........... H04N 7/181 348/14.08 |
| 2013/0050496 A1 * | 2/2013 | Jeong ........................... 348/159 |
| 2013/0103943 A1 * | 4/2013 | Hirsch et al. ................. 713/168 |
| 2014/0273946 A1 * | 9/2014 | Himmelstein ................ 455/406 |

* cited by examiner

*Primary Examiner* — Sarah Su

(74) *Attorney, Agent, or Firm* — Angel N. Gerdzhikov; Donna P. Suchy; Daniel M. Barbieri

(57) ABSTRACT

A method for indicating the security level of a selected element on a multi-level security display includes determining a security level of a selected element and modifying the visual representation of the selected element to indicate the security level and/or providing an audible tone. Visual distinction may include a security tag, color variation or flashing pattern.

18 Claims, 3 Drawing Sheets

HIGH ASSURANCE CLASSIFICATION DISAMBIGUATION OF USER INPUT ON TACTICAL DISPLAY SYSTEMS

FIELD OF THE INVENTION

The present invention is directed generally toward computer displays and more particularly toward information display in an environment having multiple security levels.

BACKGROUND OF THE INVENTION

In applications requiring access to information from multiple, distinct levels of classification or security, a user may have multiple displays; each display only allowing access to information from a single classification or security level. Such systems simplify the process of segregating information, but complicate the process of correlating the information.

Multi-level security (MLS) displays may integrate information from several different classification or security levels, but in applications where information from multiple, different classification or security levels is made accessible on a MLS display, a user may have substantial difficulty determining the classification level of any particular piece of information or communication portal. Such difficulty can cause confusion and information leakages.

Traditionally, all information on a MLS display is indicated at the highest classification or security level of any single piece of information; the user is then left to determine the actual classification or security level of a particular piece of information and the classification or security level of a particular communication portal based on the user's judgment. Such a system is prone to user error.

Consequently, it would be advantageous if an apparatus existed that is suitable for providing a secure, high assurance visual indication of a particular classification or security level of information or communication portals.

SUMMARY OF THE INVENTION

Accordingly, the present invention is directed to a novel method and apparatus for providing a secure, high assurance visual indication of a particular classification or security level of information or communication portals.

One embodiment of the present invention is a computer system with a MLS display, an input device and a processor. The processor renders elements such as information or communication portals onto the MLS display, including a visual indication of the classification or security level of each element.

Another embodiment of the present invention is a computer system with a MLS display, an input device and a processor. The user selects an element with an input device and the processor renders the element onto the MLS display, including a visual indication of the classification or security level of the element.

Another embodiment of the present invention is a method for indicating the classification or security level of elements on a MLS display including identifying an element, determining the classification or security level of the element and modifying the visual representation of the element to indicate the security level.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

Reference will now be made in detail to the subject matter disclosed, which is illustrated in the accompanying drawings. The scope of the invention is limited only by the claims; numerous alternatives, modifications and equivalents are encompassed. For the purpose of clarity, technical material that is known in the technical fields related to the embodiments has not been described in detail to avoid unnecessarily obscuring the description.

Figure 1:
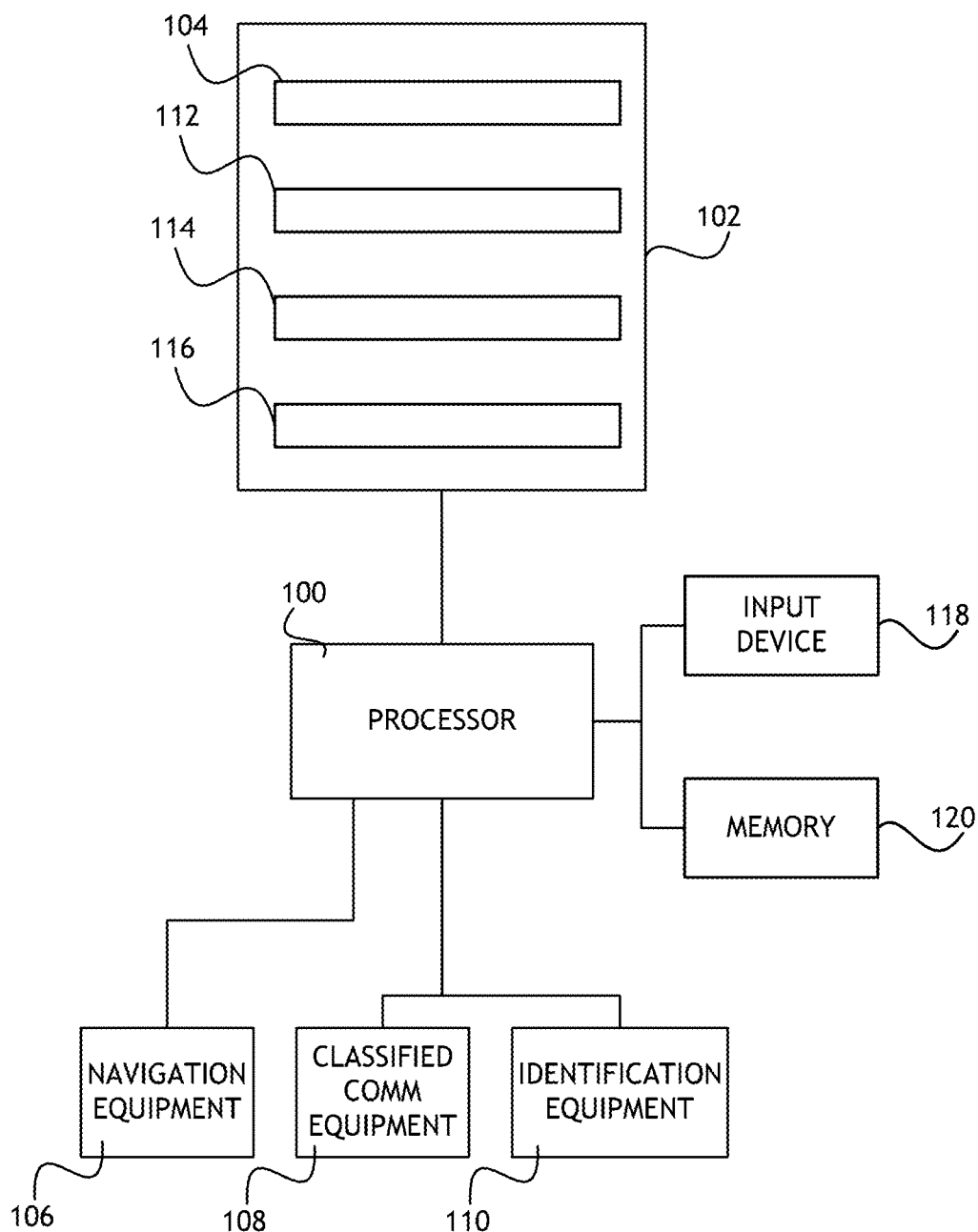
FIG. 1 shows a block diagram of a system for displaying data having multiple security levels.

Referring to FIG. 1, a block diagram of a system for displaying data having multiple security levels is shown. The system may include a processor 100. The processor may be connected to a MLS display 102. The MLS display 102 may render one or more elements 104, 112, 114, 116; and each of the one or more elements 104, 112, 114, 116 may be associated with a different security level. For example, a first element 104 may be associated with a security level such as "secret" while a second element 112 may be associated with a security level such as "top secret" and a third element 114 may be associated with a security level such as "unclassified." Elements 104, 112, 114, 116 may include text communication boxes, chat windows, rendered representations of physical objects identified by radar, or any other data subject to graphical representation.

The processor 100 may also be connected to one or more input devices 118 and a memory 120. An input device 118 may include any device capable of receiving a user input to select a security level such as a touch screen, keyboard or voice input. The memory 120 may comprise a data structure to associate elements 104, 112, 114, 116 with one or more security levels.

The system may also include one or more data communication devices 106, 108, 110. Data communication devices 106, 108, 110 may include navigation equipment, identification equipment, communication equipment, or any other device capable of sending, receiving or producing data for representation on a display such as the MLS display 102. Each of the one or more data communication devices 106, 108, 110 may produce or communicate data at varying levels of security. The processor 100 may receive data, and an associated indicator of a security level for such data, from each of the one or more data communication devices 106, 108, 110. Alternatively, a security level for particular data may be inferred based on the nature of the data communication device 106, 108, 110 from which the data was received. One or more elements 104, 112, 114, 116 may be exclusively associated with one of the data communication devices 106, 108, 110.

The processor 100 and the MLS display 102 may render data from each of the one or more communication device 106, 108, 110 within one or more elements 104, 112, 114, 116. The security level associated with each element 104, 112, 114, 116 may correspond to the security level associated with the data from corresponding the data communication device 106, 108, 110.

Figure 2:
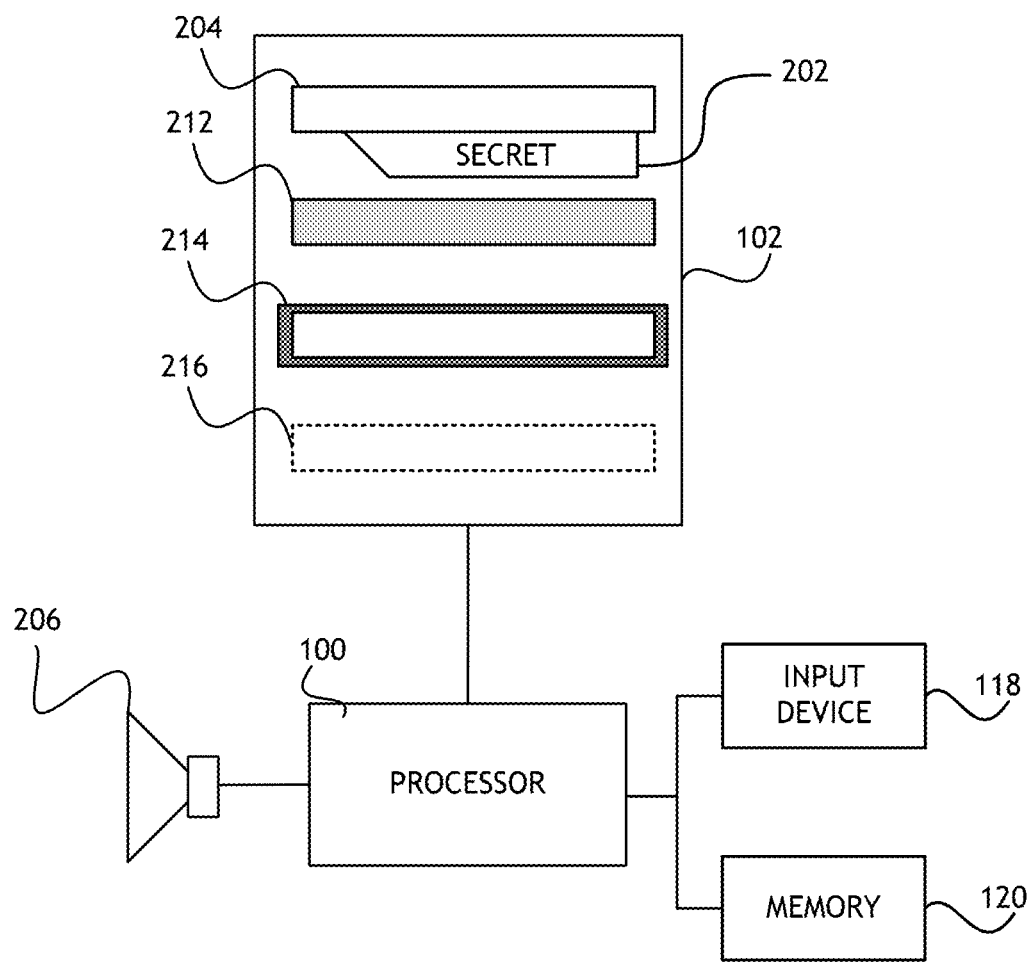
FIG. 2 shows a block diagram of a system displaying data with indications of the security level for the data.

Referring to FIG. 2, a block diagram of a system displaying data with indications of the security level for the data is shown. In a system such as the system shown in FIG. 1, having a processor 100 connected to a MLS display 102, the processor 100 and MLS display 102 may render elements 204, 212, 214, 216 associated with data having more than one security level. The elements 204, 212, 214, 216 may facilitate data communication with a system or individual cleared for a particular security level. Such data and associated security level may be stored in a data structure in a memory 120 connected to the processor 100.

A user may select a particular element 204, 212, 214, 216 through an input device 118. The processor 100 and MLS display 102 may render the selected element 204, 212, 214, 216 in such a way as to visually distinguish the selected element 204, 212, 214, 216 from other elements 204, 212, 214, 216 based on associated security level. For example, a first element 204 may be associated with a security level such as "secret" while a second element 212 may be associated with a security level such as "top secret." A user may select the first element 204 using the input device 118. The processor may reference a data structure in the memory 120 to determine the classification or security level of the first element 204. The processor 100 and MLS display 102 may then render the first element 204 so as to indicate the classification or security level of the first element 204. In this example, the processor 100 may append a tag 202 to the first element 204 indicating that the first element 204 is classified "secret." Alternatively, the processor 100 may render an element 204, 212, 214, 216 in a distinctive color (see the second element 212), with a distinctive halo (see the third element 214), with a distinctive flashing patterns (see the fourth element 216), or any other visual mechanism indicating classification or security level. Furthermore, the processor 100 may provide an audible indication of the classification or security level of the selected element 204, 212, 214, 216 through an audio device 206.

The present embodiment may offer a user a visual indication of the classification or security level of a desired element 204, 212, 214, 216. The embodiment may limit visual clutter by only displaying such visual indications when desired by the user. Alternatively, appropriate visual indications could be rendered at all times, or at all times except when a user desires a de-cluttered view.

A user may also select, via the input device 118, to return to a default rendering on the MLS display 102. The processor 100 may then re-render all elements 204, 212, 214, 216 normally, removing any visual indications of classification or security level.

Figure 3:
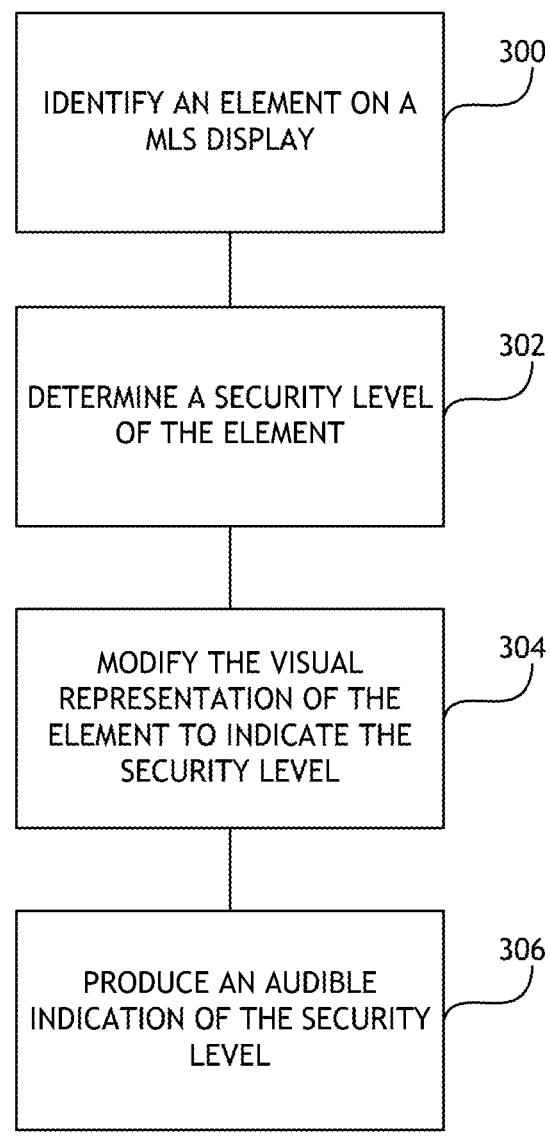
FIG. 3 shows a flowchart for a method of indicating security levels of data on an MLS display.

Referring to FIG. 3, a flowchart for a method of indicating security levels of data on an MLS display is shown. A user may select an element on a MLS display with an input device connected to a processor. The processor may identify 300 the selected element and determine 302 the security level of the selected element. Elements may be associated with a selected security level in a data structure, or communication portals associated with elements may be associated with a security level.

The processor may then modify 304 the visual representation of the selected element to indicate the security level associated with the selected element. Visual indications may include a tag, a distinctive color, a distinctive flashing pattern or any other mechanism to visually distinguish security levels. The processor may also produce 306 an audible indication of the security level of the selected element.

"Security levels" according to the present invention may be relative or absolute. While the foregoing discussion has specifically referenced "unclassified," "secret" and "top secret" as examples of security levels, security levels may include any appropriate designation. Furthermore, definitions of security levels may not be consistent between systems or networks. A system according to the present invention may interpret security levels as necessary to conform to elements and associated security levels already rendered in the system.

It is believed that the present invention and many of its attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. An apparatus comprising:
   a multi-level security display;
   a processor connected to the multi-level security display;
   a first data communication device configured to receive navigational data;
   a second data communication device configured to send and receive real-time communications;
   a third data communication device configured to receive object identification data;
   an input device connected to the processor; and
   computer executable program code configured to execute on the processor,
   wherein:
      the multi-level security display is configured to display a first element corresponding to data exclusively received from the first data communication device associated with a first security level, a second element corresponding to data exclusively received from the second data communication device associated with a second security level, and a third element corresponding to data exclusively received from the third data communication device associated with a second security level;
      the computer executable program code is configured to:
         determine the first security level based on a predetermined security level associated with navigational communication devices;
         determine the second security level based on a predetermined security level associated with real-time data communication devices;
         receive an element selection from the input device, such element selection corresponding to the first element; and
         render a visual indication of the first security level in response to the received element selection.

2. The apparatus of claim 1, wherein the visual indication comprises a tag visually connected to the first element.

3. The apparatus of claim 1, wherein the visual indication comprises a modification to a color of the first element.

4. The apparatus of claim 1, wherein the visual indication comprises a flashing pattern of the first element.

5. The apparatus of claim 1, further comprising a memory connected to the processor, wherein the memory is configured to store at least one data structure associating at least one element with a security level.

6. The apparatus of claim 5, wherein the at least one data structure further associates a data stream with the at least one element.

7. The apparatus of claim 1, wherein the computer executable program code is further configured to produce an audible indication of the first security level.

8. A display system comprising:
a processor configured to:
   determine a first security level based on a predetermined security level associated with navigational communication devices;
   render a first element corresponding to data exclusively received from the navigation system having the first security level for display on a multi-level security display;
   determine a second security level based on a predetermined security level associated with real-time data communication devices;
   render a second element corresponding to data exclusively received from the real-time communication system having the second security level for display on the multi-level security display;
   determine a third security level based on a predetermined security level associated with an object identification device;
   render a third element corresponding to data exclusively received from the object identification device having the third security level for display on the multi-level security display;
   receive an element selection from an input device corresponding to the first element; and
   modify the visual representation of the first element to visually indicate the first security level.

9. The display system of claim 8, wherein the visual indication comprises a tag visually connected to the first element.

10. The display system of claim 8, wherein the visual indication comprises a modification to a color of the first element.

11. The display system of claim 8, wherein the visual indication comprises a flashing pattern of the first element.

12. The display system of claim 8, wherein the processor is further configured to store at least one data structure associating at least one element with a security level.

13. The display system of claim 8, wherein the processor is further configured to store at least one data structure associating data for rendering at least one element with a security level.

14. The display system of claim 8, wherein the processor is further configured to produce an audible indication of the first security level.

15. A method for indicating a security level of a selected element on a multi-level security display comprising:
   determining a first security level based on a predetermined security level associated with navigational communication devices;
   rendering a first element corresponding to data exclusively received from the navigation system having the first security level for display on the multi-level security display;
   determine a second security level based on a predetermined security level associated with real-time data communication devices;
   rendering a second element corresponding to data exclusively received from the real-time communication system having the second security level for display on the multi-level security display;
   determining a third security level based on a predetermined security level associated with an object identification device;
   rendering a third element corresponding to data exclusively received from the object identification device having the third security level for display on the multi-level security display;
   receiving an element selection from an input device; and
   modifying the visual representation of the first element to visually indicate the first security level.

16. The method of claim 15, wherein the visual indication comprises a tag visually connected to the first element.

17. The method of claim 15, wherein the visual indication comprises a modification to a color of the first element.

18. The method of claim 15, further comprising producing an audible indication of the first security level.

* * * * *